(12) United States Patent
Smith et al.

(10) Patent No.: US 10,221,347 B2
(45) Date of Patent: *Mar. 5, 2019

(54) METHODS AND SYSTEMS FOR SUPPRESSING CORROSION OF SENSITIVE METAL SURFACES

(71) Applicant: Halliburton Energy Services, Inc., Houston, TX (US)

(72) Inventors: Alyssa Lynn Smith, Humble, TX (US); Enrique Antonio Reyes, Tomball, TX (US); Aaron M. Beuterbaugh, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/519,533

(22) PCT Filed: Dec. 3, 2014

(86) PCT No.: PCT/US2014/068390
§ 371 (c)(1),
(2) Date: Apr. 14, 2017

(87) PCT Pub. No.: WO2016/089394
PCT Pub. Date: Jun. 9, 2016

(65) Prior Publication Data
US 2017/0298265 A1  Oct. 19, 2017

(51) Int. Cl.
*E21B 47/12* (2012.01)
*C09K 8/54* (2006.01)
(Continued)

(52) U.S. Cl.
CPC ............... *C09K 8/54* (2013.01); *C09K 8/74* (2013.01); *C23F 11/04* (2013.01);
(Continued)

(58) Field of Classification Search
CPC ........ C09K 8/54; C09K 8/74; C09K 2208/32; C23F 11/04; C23F 11/1676; E21B 17/01; E21B 41/02; E21B 47/12; E21B 43/25
(Continued)

(56) References Cited

U.S. PATENT DOCUMENTS

| 3,222,289 A | 12/1965 | Clark et al. |
| 5,019,343 A | 5/1991 | Hwa et al. |

(Continued)

FOREIGN PATENT DOCUMENTS

| EP | 0534621 A1 | 3/1993 |
| EP | 1163969 B1 | 12/2005 |

(Continued)

OTHER PUBLICATIONS

Aboud, Ricardo Salomao et al. "Effective Matrix Acidizing in High-Temperature Environments." SPE Annual Technical Conference and Exhibition, Society of Petroleum Engineers, 2007.

(Continued)

*Primary Examiner* — Silvana C Runyan
(74) *Attorney, Agent, or Firm* — Thomas Rooney; C. Tumey Law Group PLLC

(57) ABSTRACT

Certain metal surfaces are often unable to be effectively contacted with fluids containing hydrofluoric acid due to significant corrosion issues. Titanium and titanium alloy surfaces represent but one example. Corrosion inhibitor compositions comprising boric acid and an N-(phosphonoalkyl)iminodiacetic acid or any salt thereof can be used to suppress metal corrosion, including that taking place on titanium and titanium alloy surfaces. Methods for suppressing corrosion of a metal surface can comprise: contacting a metal surface with a corrosive environment, the metal surface comprising titanium or a titanium alloy and the corrosive environment comprising hydrofluoric acid; introducing (Continued)

a corrosion inhibitor composition to the corrosive environment, the corrosion inhibitor composition comprising boric acid and an N-(phosphonoalkyl)iminodiacetic acid or any salt thereof; contacting the metal surface with the corrosion inhibitor composition; and allowing the corrosion inhibitor composition to suppress corrosion of the metal surface by the corrosive environment.

17 Claims, 1 Drawing Sheet

(51) Int. Cl.

| | | |
|---|---|---|
| C09K 8/74 | (2006.01) | |
| C23F 11/04 | (2006.01) | |
| C23F 11/167 | (2006.01) | |
| E21B 17/01 | (2006.01) | |
| E21B 41/02 | (2006.01) | |
| E21B 43/25 | (2006.01) | |

(52) U.S. Cl.
CPC .......... *C23F 11/1676* (2013.01); *E21B 17/01* (2013.01); *E21B 41/02* (2013.01); *E21B 47/12* (2013.01); *C09K 2208/32* (2013.01); *E21B 43/25* (2013.01)

(58) Field of Classification Search
USPC ........................................................ 166/300
See application file for complete search history.

(56) References Cited

U.S. PATENT DOCUMENTS

| | | | |
|---|---|---|---|
| 5,051,197 | A | 9/1991 | Kalfayan et al. |
| 5,120,471 | A | 6/1992 | Jasinski et al. |
| 5,171,460 | A | 12/1992 | Underdown |
| 5,294,371 | A | 3/1994 | Clubley et al. |
| 5,529,125 | A | 6/1996 | Di Lullo Arias et al. |
| 5,543,388 | A | 8/1996 | Williams et al. |
| 6,001,186 | A | 12/1999 | Johnson et al. |
| 6,117,364 | A | 9/2000 | Vorderbruggen et al. |
| 6,506,711 | B1 | 1/2003 | Shuchart et al. |
| 7,192,908 | B2 | 3/2007 | Frenier et al. |
| 7,915,205 | B2 | 3/2011 | Smith et al. |
| 2004/0254079 | A1 | 12/2004 | Frenier et al. |
| 2005/0016731 | A1 | 1/2005 | Rae et al. |
| 2006/0054325 | A1 | 3/2006 | Brown et al. |
| 2006/0131022 | A1 | 6/2006 | Rae et al. |
| 2006/0219661 | A1 | 10/2006 | Towse et al. |
| 2006/0281636 | A1 | 12/2006 | Smith et al. |
| 2007/0071887 | A1 | 3/2007 | Cassidy et al. |
| 2007/0235189 | A1 | 10/2007 | Milne et al. |
| 2008/0006409 | A1 | 1/2008 | Brown et al. |
| 2008/0200354 | A1 | 8/2008 | Jones et al. |
| 2008/0280046 | A1* | 11/2008 | Bryden ................ C23C 22/34 427/327 |
| 2009/0042748 | A1 | 2/2009 | Fuller |
| 2009/0075844 | A1* | 3/2009 | Ke ...................... C09K 8/528 507/90 |
| 2011/0028360 | A1 | 2/2011 | Jenkins |
| 2011/0190173 | A1* | 8/2011 | Cassidy ................ C09K 8/54 507/241 |
| 2011/0286802 | A1 | 11/2011 | Persson et al. |
| 2012/0115759 | A1 | 5/2012 | Reyes |
| 2012/0128530 | A1 | 5/2012 | Jenkins et al. |
| 2013/0079260 | A1 | 3/2013 | Frenier et al. |
| 2013/0269946 | A1 | 10/2013 | Dziekonski |
| 2013/0269947 | A1 | 10/2013 | Shilling et al. |
| 2014/0119984 | A1 | 5/2014 | Belakshe et al. |
| 2015/0005216 | A1 | 1/2015 | De Wolf et al. |

FOREIGN PATENT DOCUMENTS

| | | |
|---|---|---|
| GB | 2404211 A | 1/2005 |
| GB | 2453630 A | 4/2009 |
| WO | 2008077005 A1 | 6/2008 |
| WO | 2009121893 A1 | 10/2009 |
| WO | 2016089391 A1 | 6/2016 |
| WO | 2016089394 A1 | 6/2016 |
| WO | 2016089459 A1 | 6/2016 |

OTHER PUBLICATIONS

Baxter, Carl F. et al. "Experience and Guidance in the Use of Titanium Components in Steel Catenary Riser Systems." OTC 18624, In Offshore Technology Conference, Offshore Technology Conference, Apr. 30-May 3, 2007 (13 pages).

"Corrosion Resistant Alloys for Deep Offshore Drilling by High Density Infrared Fusion Process", T1S4O2 Paper. Retrieved from URL: http://pennwell.sds06.websds.net/2013/dot/papers/T1S4O2-paper.pdf on Apr. 12, 2017 (19 pages).

Denney, Dennis. "Ultradeep HP/HT Completions: Classification, Design Methodologies, and Technical Challenges", J. Petroleum Technologies, pp. 83-85, Mar. 2007.

Gomez, Julio, et al. "Acid Stimulation of Geothermal Wells in Central America", SPE 121300, Society of Petroleum Engineers, SPE Latin American and Caribbean Petroleum Engineering Conference, May 31-Jun. 3, 2009 (10 pages).

Hill, Donald G. et al. "Reduction of Risk to the Marine Environment From Oilfield Chemicals û Environmentally Improved Acid Corrosion Inhibition for Well Stimulation." In Corrosion 2000. NACE International, 2000.

Hua, Fred et al. "Corrosion of Ti Gr 7 and other Titanium Alloys in Nuclear Waste Repository Environments—A Review", Corrosion 2004, Paper No. 04689, NACE International, 2004 (43 pages).

Jaramillo, O.J., et al. "Matrix Acid Systems for Formations With High Clay Content", SPE 126719, Society of Petroleum Engineers, SPE International Symposium and Exhibition on Formation Damage Control, Feb. 10-12, 2010 (15 pages).

Ke, Mingjie et al. "Corrosion behavior of various 13 chromium tubulars in acid stimulation fluids," SPE International Symposium on Oilfield Corrosion, Society of Petroleum Engineers, 2004.

Kong, De-Sheng. "Anion-Incorporation Model Proposed for Interpreting the Interfacial Physical Origin of the Faradaic Pseudocapacitance Observed on Anodized Valve Metals;with Anodized Titanium in Fluoride-Containing Perchloric Acid as an Example", Langmuir Article, vol. 26, No. 7, pp. 4880-4891, American Chemical Society, 2010.

Mahajan, M. et al. "Successes Achieved in Acidizing of Geothermal Wells in Indonesia", SPE 100996, Society of Petroleum Engineers, SPE Asia Pacific Oil & Gas Conference, Sep. 11-13, 2006 (10 pages).

Mainier, Fernando B. et al. "Evaluation of titanium in hydrochloric acid solutions containing corrosion inhibitors" IOSR Journal of Mechanical and Civil Engineering, vol. 10, Issue 1, pp. 66-69, Nov.-Dec. 2013.

Nasr-El-Din, Hisham A. et al. "Investigation of a new single-stage sandstone acidizing fluid for high temperature formations." European Formation Damage Conference, Society of Petroleum Engineers, 2007.

Rosalbino, F. et al. "Influence of noble metals alloying additions on the corrosion behaviour of titanium in a fluoride-containing environment", Journal of Materials Science: Materials in Medicine, vol. 23, Issue 5, pp. 1129-1137, May 2012.

Seth, Kushal et al. "Development and Testing of a Novel Corrosion Inhibitor Technology for Acid Corrosion." SPE Middle East Oil and Gas Show and Conference, Society of Petroleum Engineers, 2011.

Sutter, E. M. M., et al. "The Behaviour of Titanium in Nitric-hydrofluoric Acid Solutions", Corrosion Science, vol. 30, No. 4/5, pp. 461-476, 1990.

International Search Report and Written Opinion dated Aug. 3, 2015 in PCT Application No. PCT/US2014/068390 (16 pages).

(56) References Cited

OTHER PUBLICATIONS

International Search Report and Written Opinion dated Aug. 3, 2015 in PCT Application No. PCT/US2014/068370 (14 pages).
International Search Report and Written Opinion dated Dec. 8, 2015 in PCT Application No. PCT/US2015/047680 (11 pages).

* cited by examiner

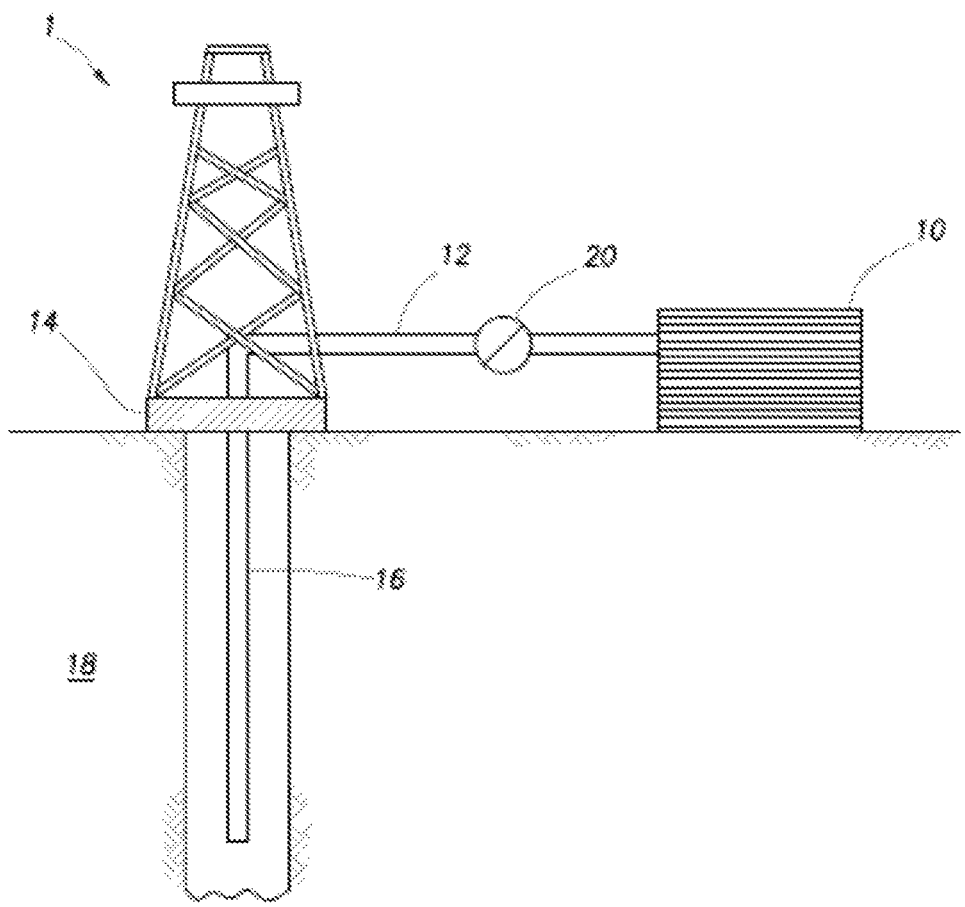

METHODS AND SYSTEMS FOR SUPPRESSING CORROSION OF SENSITIVE METAL SURFACES

BACKGROUND

The present disclosure generally relates to corrosion, and, more specifically, to methods for suppressing corrosion of sensitive metal components, particularly during subterranean treatment operations.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include, for example, drilling operations, fracturing operations, gravel packing operations, acidizing operations, scale dissolution and removal operations, sand control operations, consolidation operations, and the like.

Corrosive environments comprising an acid can cause severe corrosion damage to many types of metal surfaces. As used herein, the term "corrosion" and grammatical variants thereof will refer to any reaction between a metal surface and its surrounding environment that causes a deterioration or change in the metal surface's properties or morphology. Examples of corrosion damage to a metal surface include, but are not limited to, rusting, metal dissolution or erosion, pitting, peeling, blistering, patina formation, and any combination thereof.

Acidic treatment fluids are frequently utilized in the course of conducting various subterranean treatment operations. Illustrative uses of acidic treatment fluids during subterranean treatment operations include, for example, matrix acidizing of siliceous and/or non-siliceous formations, scale dissolution and removal operations, gel breaking, acid fracturing, and the like. When acidizing a non-siliceous material, such as a carbonate material, mineral acids such as hydrochloric acid may often be sufficient to affect dissolution. Organic acids may be used in a similar manner to hydrochloric acid when dissolving a non-siliceous material. Siliceous materials, in contrast, are only readily dissolvable using hydrofluoric acid, optionally in combination with other acids. Illustrative siliceous materials can include, for example, silica, silicates, aluminosilicates, and any combination thereof, optionally in further combination with a non-siliceous material, such as a carbonate material.

Corrosion of metal surfaces within a wellbore penetrating a subterranean formation, such as tubulars and tools, for example, can be highly undesirable due to the difficulty, cost, and production downtime associated with replacing such components. In many instances, elevated temperatures within subterranean formations can dramatically accelerate downhole corrosion rates.

Metal surfaces in fluid communication with a wellbore can similarly be susceptible to corrosion and its undesirable effects. In subsea wellbores, for example, a subsea riser structure extending from the wellbore to a platform or vessel on the ocean's surface or just below the ocean's surface can be susceptible to corrosion, in spite of the low temperatures of deep water environments. Outside the wellbore, corrosion can occur during introduction of a treatment fluid to the wellbore, during production, or any combination thereof. Regardless of its location, corrosion-induced damage of a metal surface can represent a significant safety and/or environmental concern due to potential well failure issues.

Although almost all acids represent a potential corrosion threat to many metal surfaces, hydrofluoric acid can be especially damaging when contacting certain types of sensitive metal surfaces. Illustrative examples of particularly sensitive metal surfaces include those containing titanium. Titanium and titanium alloys are lightweight, strong and resistant to most formation fluids and a great number of common treatment fluids, including those containing organic acids and/or mineral acids such as hydrochloric acid. However, titanium and titanium alloys are especially prone to corrosion by even modest quantities of hydrofluoric acid at pH values of about 7 or less. The extreme sensitivity of titanium and titanium alloys to hydrofluoric acid can preclude use of this metal in situations where acidizing of a siliceous material is anticipated to take place. For example, titanium and titanium alloys frequently form at least a portion of subsea riser structures for use in conveying fluids to and from a deepwater wellbore. Due to the propensity of titanium toward corrosion by hydrofluoric acid, it can be especially difficult to conduct stimulation operations in deepwater wellbores containing a siliceous material.

In some instances, corrosion inhibitors can be used to reduce the propensity of a metal surface to undergo corrosion-induced damage by acids. As used herein, the terms "inhibit," "inhibitor," "inhibition" and other grammatical forms thereof generally refer to the lessening of the tendency of a phenomenon to occur and/or the degree to which that phenomenon occurs. The terms "suppress," "suppression" and other grammatical forms thereof may be used equivalently herein. The term "inhibit" and equivalents thereof do not imply any particular extent or amount of inhibition or suppression unless otherwise specified herein. Although the corrosiveness of hydrochloric acid and organic acids can usually be effectively suppressed using a variety of common corrosion inhibitors, conventionally used corrosion inhibitors are often much less effective for inhibiting the corrosiveness of hydrofluoric acid, particularly for titanium and titanium alloy surfaces. Without being bound by theory or mechanism, it is believed that a passivating layer of $TiO_2$ on titanium metal surfaces is readily removed by hydrofluoric acid, thereby making the underlying titanium metal or titanium alloy extremely susceptible to further corrosion upon its removal. Although inhibited titanium alloys (e.g., Ti Grade 29 alloy, which is inhibited by small amounts of ruthenium, or Ti Grade 7 alloy, which is inhibited by small amounts of palladium) can display a decreased propensity toward corrosion in the presence of hydrofluoric acid than do pristine titanium or uninhibited alloys (e.g., commercially pure titanium, CP—Ti), corrosion is often still an issue. Moreover, cost and sourcing of inhibited titanium alloys can be problematic, especially for large-scale operations.

BRIEF DESCRIPTION OF THE DRAWING

The following FIGURE is included to illustrate certain aspects of the present disclosure and should not be viewed as an exclusive embodiment. The subject matter disclosed is capable of considerable modifications, alterations, combinations, and equivalents in form and function, as will occur to one having ordinary skill in the art and the benefit of this disclosure.

FIG. 1 shows an illustrative schematic of a system that can deliver treatment fluids of the present disclosure to a downhole location, according to one or more embodiments.

DETAILED DESCRIPTION

The present disclosure generally relates to corrosion, and, more specifically, to methods for suppressing corrosion of sensitive metal components, particularly during subterranean treatment operations.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, corrosion of metal surfaces can be detrimental for a number of reasons. It can be very difficult, in particular, to mitigate corrosion of sensitive metal surfaces, such as titanium and titanium alloy surfaces, for example, by even dilute concentrations of hydrofluoric acid. In the case of titanium dioxide, primarily anatase, electrophilic attack by hydrofluoric acid is believed to be particularly facile in generating fluorotitanite species. This is due to the strong Lewis acid character of Ti ions. Electrochemical potential may also play a role in determining the relative reactivity. At present, there are few choices for mitigating corrosion of titanium surfaces by hydrofluoric acid other than by using expensive and scarce inhibited titanium alloys, and even that approach may not be sufficient to prevent excessive corrosion from occurring. Nevertheless, inhibited titanium alloys presently represent one of the best options available to a well operator for addressing corrosion by hydrofluoric acid.

The present inventors discovered that the combination of boric acid and various N-(phosphonoalkyl)iminodiacetic acids or any salt thereof can inhibit corrosion of sensitive metal surfaces, such as titanium or titanium alloy surfaces, by dilute concentrations of hydrofluoric acid. An illustrative example of an N-(phosphonoalkyl)iminodiacetic acid that can be used in the embodiments of the present disclosure is N-(phosphonomethyl)iminodiacetic acid (PMIDA). Optionally, an organic corrosion inhibitor can also be present to supplement the corrosion-inhibiting effects, although excellent corrosion inhibition may be realized even without an additional organic corrosion inhibitor being present. Surprisingly, the corrosiveness of hydrofluoric acid may be reduced to essentially undetectable levels when treating an inhibited titanium alloy, such as Ti Grade 29 alloy. Even for uninhibited Ti Grade 1 alloy, a minuscule and operationally manageable amount of corrosion can be realized by practicing the methods of the present disclosure. In both cases, it is particularly surprising that boric acid and the N-(phosphonoalkyl)iminodiacetic acid can provide corrosion inhibition without another corrosion inhibitor being present.

More particularly, the present inventors discovered that the corrosiveness of dilute concentrations of hydrofluoric acid (e.g., about 0.5 wt. % to about 5 wt. %) may be reduced to negligible levels for titanium and titanium alloys by using the combination of boric acid and PMIDA or other N-(phosphonoalkyl)iminodiacetic acids or any salt thereof. Without including the boric acid, higher concentrations of PMIDA may be needed to achieve effective corrosion inhibition without including an organic corrosion inhibitor. That is, the PMIDA essentially enhances the corrosion inhibiting effects of the boric acid. Although the combination of boric acid and PMIDA may limit the corrosiveness of hydrofluoric acid toward titanium and other metal surfaces, the reactivity of the hydrofluoric acid toward dissolving siliceous materials is not believed to be significantly impacted. Thus, inhibiting the corrosiveness of hydrofluoric acid using the presently described methods can advantageously allow various subterranean treatment operations still to take place. Without using boric acid and PMIDA or another N-(phosphonoalkyl)iminodiacetic acid to suppress corrosion, hydrofluoric acid-based treatment operations may not otherwise be performable, especially without using costly inhibited titanium alloys. Hence, the methods of the present disclosure may allow inhibited titanium alloys to be replaced with uninhibited titanium alloys, thereby advantageously reducing operating costs. For large metal assemblies, such as subsea riser structures extending hundreds to thousands of feet below the water line, the opportunity to replace even a small quantity of inhibited titanium alloys with uninhibited titanium alloys can provide a significant bottom line cost savings in the course of producing a subterranean formation.

By utilizing boric acid and PMIDA or another N-(phosphonoalkyl)iminodiacetic acid to suppress corrosion of a titanium or other metal surface, various metal goods may be maintained in operational use for a longer period of time than would otherwise be possible before downtime to address corrosion damage. As used herein, the term "operational use" refers to the in-process deployment condition of a metal surface, particularly a metal surface comprising titanium. In oilfield operations and other process settings, decreased downtime can be highly advantageous for holding down operating costs. When boric acid and PMIDA are used to suppress corrosion, a titanium surface or other metal surface may be contacted with dilute concentrations of hydrofluoric acid and maintained in operational use for extended periods of time with negligible corrosion loss occurring. The corrosion that does occur may be operationally insignificant over the process lifetime. Without suppressing corrosion by hydrofluoric acid, replacement of the metal surface may otherwise need to take place much sooner.

PMIDA and other N-(phosphonoalkyl)iminodiacetic acids can present a number of other advantages when used in combination with boric acid for inhibiting corrosion. PMIDA and boric acid are both relatively inexpensive materials. Moreover, PMIDA is believed to be environmentally benign, due at least in part to its propensity toward biodegradation. As used herein, the terms "biodegradation," "biodegradable" and related variants thereof will refer to a substance that can be broken down by exposure to environmental conditions including native or non-native microbes, sunlight, air, heat, and the like. No particular rate of biodegradation is implied by use of these terms unless otherwise specified herein. PMIDA advantageously possesses a sufficiently high chemical stability over the short term to suppress corrosion, but a short enough biodegradation lifetime to make it environmentally friendly for use in most locales. Still further, PMIDA has good thermal stability, allowing it to be used in high temperature subterranean formations, including those above 300° F. The combination of these advantageous properties make PMIDA well suited for deployment under a wide range of process conditions.

Although the combination of boric acid and PMIDA or other N-(phosphonoalkyl)iminodiacetic acids may be particularly useful for inhibiting corrosion of titanium and titanium alloy surfaces, it is to be recognized that this combination of materials may also be effective for suppressing corrosion of other types of metal surfaces as well. Other metal surfaces that may experience a decreased extent of corrosion due to hydrofluoric acid by practicing the methods of the present disclosure include steel surfaces, copper surfaces, zinc surfaces, aluminum surfaces, nickel surfaces, and the like. Hence, it is to be recognized that any of the embodiments described herein for titanium may be extended to any type of metal surface.

In various embodiments, methods described herein may comprise: contacting a metal surface with a corrosive environment, the metal surface comprising titanium or a titanium alloy and the corrosive environment comprising hydrofluoric acid; introducing a corrosion inhibitor composition to the corrosive environment, the corrosion inhibitor composition comprising boric acid and an N-(phosphonoalkyl) iminodiacetic acid or any salt thereof; contacting the metal surface with the corrosion inhibitor composition; and allowing the corrosion inhibitor composition to suppress corrosion of the metal surface being contacted by the corrosive environment.

The corrosive environment contacting the metal surface generally comprises a fluid phase, such as a corrosive environment comprising a subterranean treatment fluid. Although the boric acid and the N-(phosphonoalkyl)iminodiacetic acid or any salt thereof may promote corrosion inhibition of a metal surface present within a wellbore or a structure in fluid communication with a wellbore, it is to be recognized that the corrosion-inhibiting effects described herein may be realized in any type of in-process setting. For example, the combination of boric acid and an N-(phosphonoalkyl)iminodiacetic acid or any salt thereof may be used for suppressing corrosion of a metal surface in a plant or process setting in which hydrofluoric acid is used. Illustrative process settings in which the combination of boric acid and an N-(phosphonoalkyl)iminodiacetic acid or any salt thereof may be used to inhibit corrosion include, for example, manufacturing processes using dilute hydrofluoric acid solutions, storage and transport structures for dilute hydrofluoric acid solutions, and the like.

In more specific embodiments, the metal surface may contact the corrosive environment in the course of performing a subterranean treatment operation. Accordingly, in such embodiments, the corrosive environment may comprise a treatment fluid. Most typically, the corrosion inhibitor composition is introduced to the corrosive environment before the corrosive environment contacts the metal surface. In some embodiments, the corrosion inhibitor composition comprising boric acid and the N-(phosphonoalkyl)iminodiacetic acid or any salt thereof may be present in the treatment fluid initially. For example, the treatment fluid may contain the corrosion inhibitor composition before the treatment fluid contacts the metal surface. In alternative embodiments, the corrosion inhibitor composition may be exposed to the metal surface before the corrosion inhibitor composition is introduced to the corrosive environment. That is, when performing a treatment operation, a treatment fluid comprising one or more components of the corrosion inhibitor composition can be introduced to a wellbore before a treatment fluid comprising hydrofluoric acid or a hydrofluoric acid-generating compound. More specifically, the boric acid, or the N-(phosphonoalkyl)iminodiacetic acid or any salt thereof, or any combination thereof may be contacted with the metal surface before being introduced to the corrosive environment in which hydrofluoric acid is present. Accordingly, in some embodiments, one or more separate fluid streams comprising boric acid and/or an N-(phosphonoalkyl)iminodiacetic acid or any salt thereof may contact a metal surface and subsequently combine with a treatment fluid comprising hydrofluoric acid or a hydrofluoric acid-generating compound to form a combined treatment fluid. In still other alternative embodiments, the corrosion inhibitor composition may be added to a treatment fluid after the treatment fluid has already begun contacting the metal surface. In some embodiments, the corrosion inhibitor composition may be added on-the-fly to a treatment fluid being introduced to a wellbore. In other embodiments, the corrosion inhibitor composition may be present in the treatment fluid before introduction of the treatment fluid to the wellbore begins.

The treatment fluids of the present disclosure may comprise an aqueous fluid or an oleaginous carrier fluid as their continuous phase. Suitable aqueous carrier fluids may include, for example, fresh water, acidified water, salt water, seawater, produced water, brine (e.g., a saturated salt solution), or an aqueous salt solution (e.g., a non-saturated salt solution). Aqueous carrier fluids may be obtained from any suitable source.

In some embodiments, the aqueous carrier fluid may be chosen such that it is substantially free of alkali metal ions. For purposes of this disclosure, an aqueous carrier fluid or a treatment fluid formed therefrom will be considered to be substantially free of alkali metal ions if less than about 1 wt. % alkali metal ions are present. Choice of an aqueous carrier fluid that is substantially free of alkali metal ions may be desirable in order to limit re-precipitation of alkali metal silicates and fluorosilicates.

In some embodiments, an organic co-solvent may be included with an aqueous carrier fluid. Suitable organic co-solvents may include, but are not limited to, glycols and alcohol solvents, for example. When present, the amount of the organic co-solvent may range between about 1% to about 50% by volume of the treatment fluid.

In other various embodiments, the carrier fluid of the treatment fluids may comprise an oleaginous carrier fluid. Suitable oleaginous carrier fluids may include, for example, an organic solvent, a hydrocarbon, oil, a refined component of oil, or any combination thereof.

In some embodiments, the hydrofluoric acid present in the treatment fluids of the present disclosure may be formed from a hydrofluoric acid-generating compound. Suitable hydrofluoric acid-generating compounds may include substances such as, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), perfluorinated organic compounds, boron trifluoride and various boron trifluoride complexes.

In some embodiments, an acid or an acid-generating compound may be present in combination with hydrofluoric acid or a hydrofluoric acid-generating compound. The acid or acid-generating compound and its amount may be chosen to adjust the protonation state and salt form of the N-(phosphonoalkyl)iminodiacetic acid and to mitigate pH changes in the treatment fluid as the hydrofluoric acid spends, for example.

Examples of acids suitable for use in combination with hydrofluoric acid or a hydrofluoric acid-generating compound may include, but are not limited to, hydrochloric acid, hydrobromic acid, formic acid, acetic acid, chloroacetic acid, dichloroacetic acid, trichloroacetic acid, fluoroacetic acid, difluoroacetic acid, trifluoroacetic acid, methanesulfonic acid, citric acid, maleic acid, glycolic acid, lactic acid, malic acid, oxalic acid, the like, and any combination thereof. Examples of suitable acid-generating compounds may include, but are not limited to, esters, aliphatic polyesters, orthoesters, poly(orthoesters), poly(lactides), poly(glycolides), poly(s-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, the like, any derivative thereof, and any combination thereof.

The pH of the treatment fluid may be chosen such that the N-(phosphonoalkyl)iminodiacetic acid is initially fully protonated, or the pH may be chosen such that one or more of the acid groups of the N-(phosphonoalkyl)iminodiacetic acid is deprotonated. When fully protonated, the N-(phosphonoalkyl)iminodiacetic acid may initially be insufficient to promote complexation of a metal ion. However, as the treatment fluid spends and the pH rises, the N-(phosphonoalkyl)iminodiacetic acid may become at least partially deprotonated in order to affect complexation of a metal ion. Regardless of its initial status for complexing a metal ion, the N-(phosphonoalkyl)iminodiacetic acid may remain active for mitigating corrosion according to the description provided herein.

The N-(phosphonoalkyl)iminodiacetic acid may be used in the corrosion inhibitor composition in its neutral form or in any salt form. In some embodiments, the carboxylic acid or phosphonic acid groups of the N-(phosphonoalkyl)iminodiacetic acid may be in a salt form, particularly an ammonium or quaternary ammonium salt form. Use of an ammonium or quaternary ammonium salt form for the acid groups desirably avoids introducing alkali metal ions into the wellbore, which otherwise may promote re-precipitation of silica scale. The protonated form of the acid groups also desirably avoids introducing unwanted alkali metal ions into the wellbore. In other various embodiments, the amine group of the N-(phosphonoalkyl)iminodiacetic acid may be used in a salt form. The amine salt form may comprise a protonated salt form, such as a hydrochloride or formate salt form, or a quaternized salt form.

In various embodiments, the neutral form of the N-(phosphonoalkyl)iminodiacetic acid that is present in the corrosion inhibitor compositions of the present disclosure may have the structure shown in Formula 1

Formula 1

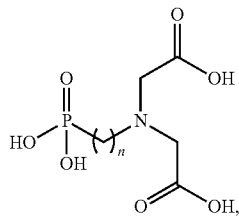

wherein n is an integer ranging between 1 and about 5. A carbon chain length of this range may be beneficial in promoting aqueous solubility of the N-(phosphonoalkyl)iminodiacetic acid. In more specific embodiments, a particularly suitable N-(phosphonoalkyl)iminodiacetic acid for practicing the disclosure herein can be N-(phosphonomethyl)iminodiacetic acid, in which n is 1.

As indicated above, the corrosiveness of dilute concentrations of hydrofluoric acid toward titanium and titanium alloy surfaces may be effectively inhibited by practicing the methods of the present disclosure. Correspondingly small quantities of boric acid and the N-(phosphoalkyl)iminodiacetic acid may be effective to inhibit corrosion of titanium or titanium alloy surfaces such that little to no corrosion occurs. In the case of inhibited titanium alloys, the corrosion loss may be essentially immeasurable.

In various embodiments, a hydrofluoric acid concentration in the corrosive environment may range between about 0.5 wt. % and about 5 wt. %. These values may represent the hydrofluoric acid concentration in a treatment fluid or the generatable hydrofluoric acid concentration in a treatment fluid. Hydrofluoric acid concentrations in this range may be particularly effective for performing various subterranean treatment operations, such as descaling and matrix dissolution, for example.

The chosen concentrations of boric acid and the N-(phosphonoalkyl)iminodiacetic acid or any salt thereof may represent an effective amount to counterbalance the corrosive effects of the quantity of hydrofluoric acid that is present. In particular embodiments, a concentration of the N-(phosphonoalkyl)iminodiacetic acid or any salt thereof in the corrosive environment may range between about 0.5 wt. % and about 10 wt. %. In more particular embodiments, a concentration of the N-(phosphonoalkyl)iminodiacetic acid or any salt thereof in the corrosive environment may range between about 1 wt. % to about 5 wt. %. In various embodiments, a concentration of boric acid in the corrosive environment may range between about 2 wt. % and about 14 wt. %. Again, the foregoing concentration ranges may represent the concentrations of boric acid and the N-(phosphonoalkyl)iminodiacetic acid or any salt thereof that are present in a treatment fluid in which hydrofluoric acid or a hydrofluoric acid-generating compound is present.

The boric acid present in the corrosive environment or the treatment fluid may be introduced and/or generated therein in a variety of manners. In some embodiments, boric acid itself may be introduced to the corrosive environment. In other embodiments, boric acid may be generated within the corrosive environment from a boric acid precursor. In some embodiments, boric acid may be generated in the corrosive environment from borax and an acid such as hydrochloric acid. Other suitable boric acid precursors may include, for example, tetraborates (e.g., sodium tetraborate), tetrafluoroborates, metal borate ligand complexes (ligand=oxalic acid, citric acid, glycolic acid, lactic acid, tartaric acid, malic acid, maleic acid, and succinic acid), boronic acids, boronate esters, and organotrifluoroborates.

Optionally, the PMIDA or other N-(phosphonoalkyl)iminodiacetic acids may also complex a metal ion without substantially altering their ability to mitigate the corrosiveness of hydrofluoric acid. As used herein, the terms "complex," "complexing," "complexation" and other grammatical variants thereof will refer to the formation of a metal-ligand bond. Although complexation of a metal ion may involve a chelation process in some embodiments, complexation is not deemed to be limited in this manner. PMIDA effectively complexes a wide variety of metal ions with a range of stability constants. Table 1 below shows the stability constants at 20° C. of several metal ions complexed with PMIDA.

TABLE 1

| Metal Ion | $\text{Log}_{10}$ of Stability Constant |
|---|---|
| $Mg^{2+}$ | 6.28 |
| $Ca^{2+}$ | 7.18 |
| $Sr^{2+}$ | 5.59 |
| $Ba^{2+}$ | 5.35 |

Unlike some alkaline earth phosphonates, these complexes are advantageously soluble in low pH aqueous fluids (pH=0.5-5). The N-(phosphonoalkyl)iminodiacetic acid or any salt thereof may initially be in a salt form suitable for complexing a metal ion, or a salt form suitable for complexing a metal ion may form as the treatment fluid spends. Metal ions complexed by the N-(phosphonoalkyl)iminodiacetic acid or any salt thereof may arise from any source being contacted by the corrosive environment. For example, aluminum ions arising from dissolution of an aluminosilicate may be complexed.

Although PMIDA and other N-(phosphonoalkyl)iminodiacetic acids may themselves complex metal ions, an additional chelating agent may also be present in the corrosive environment or in a treatment fluid formed therefrom. The optional chelating agent may increase the amount of metal ions that may be complexed, and/or the chelating agent may be chosen to confer selectivity toward metal ions that are not as effectively complexed by PMIDA and other N-(phosphonoalkyl)iminodiacetic acids.

Suitable chelating agents are not believed to be particularly limited. In illustrative embodiments, traditional chelating agents such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediamined(o-hydroxyphenylacetic) acid (EDDHA), glucoheptonic acid, gluconic acid, citric acid, any salt thereof, any derivative thereof, or the like may be present as the optional chelating agent.

In other various embodiments, an aminopolycarboxylic acid may be present as the optional chelating agent. A number of aminopolycarboxylic acids have the additional advantage of being biodegradable, which may be advantageous for their use in various subterranean operations. Illustrative aminopolycarboxylic acid chelating agents may include, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N"-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof.

Optionally, an organic corrosion inhibitor may be present in combination with the boric acid and the N-(phosphonoalkyl)iminodiacetic acid in the corrosive environment. That is, in some embodiments, the corrosion inhibitor composition may further comprise an organic corrosion inhibitor. The identity and amount of the organic corrosion inhibitor may vary in view of the amounts of hydrofluoric acid, boric acid and/or N-(phosphonoalkyl)iminodiacetic acid or any salt thereof that are present. In illustrative embodiments, a concentration of the organic corrosion inhibitor in the corrosive environment may range between about 0.1 wt. % to about 5 wt. %. In more specific embodiments, a concentration of the organic corrosion inhibitor may range between about 0.5 wt. % to about 5 wt. %, or between about 1 wt. % to about 3 wt. %, or between about 2 wt. % to about 4 wt. %.

Illustrative organic corrosion inhibitors may include compounds such as, for example, an acetylenic alcohol, a Mannich condensation product, an unsaturated carbonyl compound, an unsaturated ether, formamide or a reaction product thereof, a formate, an iodide, a terpene, an aromatic hydrocarbon, cinnamaldehyde or a derivative thereof, a fluorinated surfactant, a quaternary derivative of a heterocyclic nitrogen base, a quaternary derivative of a halomethylated aromatic compound, or any combination thereof. Other illustrative corrosion inhibitors include, for example, a reaction product of an α,β-unsaturated aldehyde or ketone with a primary or secondary amine, and a reaction product of an aldehyde with a thiol and/or an amide. The reaction product may be pre-formed before placing it in a corrosive environment, such as a treatment fluid, or it may be formed in situ from the individual components within the corrosive environment. In illustrative embodiments, a suitable organic corrosion inhibitor may comprise MSA-III (a sulfur-containing organic acid corrosion inhibitor), HAI-404M (a quaternary ammonium corrosion inhibitor), or HAI-OS (an acetylenic alcohol corrosion inhibitor), each of which is available from Halliburton Energy Services.

Further optionally, a corrosion inhibitor intensifier may be present in the corrosion inhibitor composition. Corrosion inhibitor intensifiers, sometimes referred to as activators, can function to activate another corrosion inhibitor. Corrosion inhibitor intensifiers that can be used in the embodiments of the present disclosure include quaternary ammonium compounds, copper compounds (e.g., cuprous iodide, and cuprous chloride), antimony compounds (e.g., antimony oxides, antimony halides, antimony tartrate, antimony citrate, antimony tartrate, antimony citrate, pyroantimonate salts, and antimony adducts of ethylene glycol), bismuth compounds (e.g., bismuth oxides, bismuth halides, bismuth tartrate, and bismuth citrate), iodine, iodide compounds (e.g., potassium iodide and sodium iodide), formic acid, and any combination thereof. When present, a concentration of the corrosion inhibitor intensifier in a treatment fluid may range from about 0.1 wt. % to about 5.0 wt. %.

In additional embodiments, the treatment fluids described herein may further comprise any number of additives that are commonly used in downhole operations including, for example, silica scale control additives, surfactants, gel stabilizers, anti-oxidants, polymer degradation prevention additives, relative permeability modifiers, scale inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Any combination of these additives may be used as well. One of ordinary skill in the art will be able to formulate a treatment fluid having properties suitable for a given application.

In some embodiments, the metal surface may remain in contact with the corrosive environment for at least about 1 hour by practicing the methods of the present disclosure. In other various embodiments, the metal surface may remain in contact with the corrosive environment for at least about 2 hours, or at least about 4 hours, or at least about 6 hours, or at least about 12 hours, or at least about 24 hours after contacting the treatment fluid.

In some embodiments, the metal surface being contacted by the corrosion inhibitor composition may be present in a wellbore into which the treatment fluid is being introduced. For example, metal surfaces in a wellbore that may be contacted by the corrosion inhibitor composition may represent a tubular or a portion of a wellbore tool. In other various embodiments, the metal surface may not be present in the wellbore per se, but may instead be represent a structure in fluid communication with the wellbore. For example, pipelines, subsea riser structures, mixing tanks and storage vessels outside the wellbore may also be contacted with the corrosion inhibitor composition according to some embodiments of the present disclosure in order to suppress corrosion in the presence of hydrofluoric acid.

In more specific embodiments, the metal surface being contacted by the corrosion inhibitor composition may comprise at least a portion of a subsea riser structure. At least a portion of a subsea riser structure may comprise titanium or a titanium alloy. In still more specific embodiments, at least a portion of a subsea riser structure may comprise multiple types or grades of titanium alloys. Accordingly, by contacting a subsea riser structure with a corrosion inhibitor composition of the present disclosure, corrosion resulting from conveyance of hydrofluoric acid to and/or from the wellbore may be suppressed.

In some embodiments, methods of the present disclosure may further comprise introducing a treatment fluid containing the corrosion inhibitor composition into a wellbore penetrating a subterranean formation. The corrosion inhibitor composition may suppress corrosion of a metal surface present in the wellbore or in fluid communication with the wellbore.

Once within the wellbore, the treatment fluid containing the corrosion inhibitor composition may perform various functions, such as the treatment operations described above. In more particular embodiments, the treatment operation may comprise contacting a siliceous material with the treatment fluid, and at least partially dissolving the siliceous material with the treatment fluid. Dissolution may involve reacting the siliceous material with the hydrofluoric acid. Illustrative siliceous materials that may be contacted and dissolved with the hydrofluoric acid include, for example, silica, silicates, aluminosilicates, geothermal scale, the like, and any combination thereof. In various embodiments, dissolving geothermal scale may comprise dissolving at least a portion of the geothermal scale with the hydrofluoric acid to produce a metal ion, and complexing the metal ion with the N-(phosphonoalkyl)iminodiacetic acid or another chelating agent. Complexation of the metal ion by the N-(phosphonoalkyl)iminodiacetic acid or another chelating agent may substantially prevent re-precipitation of an insoluble form of the metal ion.

In some embodiments, methods described herein may comprise: providing a treatment fluid comprising: hydrofluoric acid or a hydrofluoric acid-generating compound, and a corrosion inhibitor composition comprising boric acid, and an N-(phosphonoalkyl)iminodiacetic acid or any salt thereof; introducing the treatment fluid into a wellbore penetrating a subterranean formation; and contacting the treatment fluid with a metal surface present in the wellbore or in fluid communication with the wellbore, the metal surface comprising titanium or a titanium alloy. In further embodiments, the methods may further comprise performing a treatment operation in the wellbore, such as at least partially dissolving a siliceous material that may be present in the wellbore or in the subterranean formation.

In more specific embodiments, methods of the present disclosure may comprise: contacting boric acid, or an N-(phosphonoalkyl)iminodiacetic acid or any salt thereof, or any combination thereof with a metal surface present in a wellbore or in fluid communication with a wellbore, the metal surface comprising titanium or a titanium alloy; after exposing the metal surface to the boric acid, or an N-(phosphonoalkyl)iminodiacetic acid or any salt thereof, or any combination thereof, combining the boric acid or the N-(phosphonoalkyl)iminodiacetic acid or any salt thereof, or any combination thereof with a treatment fluid comprising hydrofluoric acid or a hydrofluoric acid-generating compound to form a combined treatment fluid, the combined treatment fluid comprising hydrofluoric acid or a hydrofluoric acid-generating compound, boric acid, and an N-(phosphonoalkyl)iminodiacetic acid; and contacting the combined treatment fluid with the metal surface.

Accordingly, in some embodiments, boric acid and an N-(phosphonoalkyl)iminodiacetic acid or any salt thereof may be exposed to the metal surface in separate fluid streams, and the separate fluid streams may then be combined with the treatment fluid comprising hydrofluoric acid or a hydrofluoric acid-generating compound to form the combined treatment fluid. In other embodiments, a single fluid stream comprising boric acid and an N-(phosphonoalkyl)iminodiacetic acid or any salt thereof may contact the metal surface and then be combined with the treatment fluid comprising hydrofluoric acid or a hydrofluoric acid-generating compound to form the combined treatment fluid. After forming the combined treatment fluid, the concentration ranges of the hydrofluoric acid or hydrofluoric acid-generating compound, the boric acid, and the N-(phosphonoalkyl) iminodiacetic acid or any salt thereof may reside in the concentration ranges described above.

In other various embodiments, systems configured for delivering a treatment fluid of the present disclosure to a downhole location are described herein. In various embodiments, the systems can comprise a pump fluidly coupled to a tubular, the tubular containing a treatment fluid comprising hydrofluoric acid or a hydrofluoric acid-generating compound and a corrosion inhibitor composition comprising boric acid and an N-(phosphonoalkyl)iminodiacetic acid or any salt thereof.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce a treatment fluid of the present disclosure to a subterranean formation at or above a fracture gradient of the subterranean formation, but it may also be used in cases where fracturing is not desired. The treatment fluids described herein may be introduced with a high pressure pump, or they may be introduced following a treatment fluid that was introduced with a high pressure pump. In some embodiments, the high pressure pump may be capable of fluidly conveying particulate matter into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of a treatment fluid before it reaches the high pressure pump. Alternately, the low pressure pump may be used to directly introduce the treatment fluid to the subterranean formation.

In some embodiments, the systems described herein can further comprise a mixing tank that is upstream of the pump and in which the pressure-mitigating material is formulated with a carrier fluid. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. For example, the treatment fluid may be delivered to the downhole location of a subsea wellbore using a subsea riser structure, such as a subsea riser containing titanium or a titanium alloy. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Tubular 16 may include orifices that allow the treatment fluid to enter into the wellbore. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may flow back to wellhead 14 in a produced hydrocarbon fluid from subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. Methods for suppressing corrosion. The methods comprise: contacting a metal surface with a corrosive environment, the metal surface comprising titanium or a titanium alloy and the corrosive environment comprising hydrofluoric acid; introducing a corrosion inhibitor composition to the corrosive environment, the corrosion inhibitor composition comprising boric acid and an N-(phosphonoalkyl) iminodiacetic acid or any salt thereof; contacting the metal surface with the corrosion inhibitor composition; and suppressing corrosion of the metal surface by the corrosive environment through contact with the corrosion inhibitor composition.

B. Methods for suppressing corrosion. The methods comprise: providing a treatment fluid comprising: hydrofluoric acid or a hydrofluoric acid-generating compound, and a corrosion inhibitor composition comprising boric acid, and an N-(phosphonoalkyl)iminodiacetic acid or any salt thereof; introducing the treatment fluid into a wellbore penetrating a subterranean formation; and contacting the treatment fluid with a metal surface present in the wellbore or in fluid communication with the wellbore, the metal surface comprising titanium or a titanium alloy.

C. Methods for suppressing corrosion. The methods comprise: contacting a metal surface present in a wellbore or in fluid communication with a wellbore with a corrosion inhibitor composition; wherein the metal surface comprises titanium or a titanium alloy; and wherein the corrosion inhibitor composition comprises a substance selected from the group consisting of boric acid, an N-(phosphonoalkyl)iminodiacetic acid, any salt of an N-(phosphonoalkyl)iminodiacetic acid, and any combination thereof; and after contacting the metal surface with the corrosion inhibitor composition, exposing the metal surface to a treatment fluid comprising hydrofluoric acid or a hydrofluoric acid-generating compound; wherein the corrosion inhibitor composition becomes combined with the treatment fluid.

D. Systems for introducing a corrosion inhibitor composition into a wellbore. The systems comprise: a pump fluidly coupled to a tubular, the tubular containing a treatment fluid comprising hydrofluoric acid or a hydrofluoric acid-generating compound and a corrosion inhibitor composition comprising boric acid and an N-(phosphonoalkyl)iminodiacetic acid or any salt thereof.

Each of embodiments A-D may have one or more of the following additional elements in any combination:

Element 1: wherein a hydrofluoric acid concentration in the corrosive environment ranges between about 0.5 wt. % and about 5 wt. %.

Element 2: wherein a concentration of the N-(phosphonoalkyl)iminodiacetic acid or any salt thereof in the corrosive environment ranges between about 0.5 wt. % and about 10 wt. %, and a concentration of boric acid in the corrosive environment ranges between about 2 wt. % and about 14 wt. %.

Element 3: wherein a concentration of the N-(phosphonoalkyl)iminodiacetic acid or any salt thereof in the corrosive environment ranges between about 0.5 wt. % and about 10 wt. %.

Element 4: wherein a concentration of boric acid in the corrosive environment ranges between about 2 wt. % and about 14 wt. %.

Element 5: wherein the corrosion inhibitor composition is introduced to the corrosive environment before the corrosive environment contacts the metal surface.

Element 6: wherein the corrosive environment comprises a treatment fluid and the corrosion inhibitor composition is present in the treatment fluid.

Element 7: wherein the method further comprises: introducing the treatment fluid into a wellbore penetrating a subterranean formation, the metal surface being present in the wellbore or in fluid communication with the wellbore.

Element 8: wherein the method further comprises: contacting a siliceous material with the treatment fluid; and at least partially dissolving the siliceous material with the treatment fluid.

Element 9: wherein the boric acid, or the N-(phosphonoalkyl)iminodiacetic acid or any salt thereof, or any combination thereof are contacted with the metal surface before being introduced to the corrosive environment.

Element 10: wherein the corrosive environment comprises a treatment fluid.

Element 11: wherein the method further comprises: introducing the treatment fluid into a wellbore penetrating a subterranean formation, the metal surface being present in the wellbore or in fluid communication with the wellbore.

Element 12: wherein the method further comprises: contacting a siliceous material with the treatment fluid; and at least partially dissolving the siliceous material with the treatment fluid.

Element 13: wherein the metal surface comprises at least a portion of a subsea riser structure.

Element 14: wherein the N-(phosphonoalkyl)iminodiacetic acid has a structure of

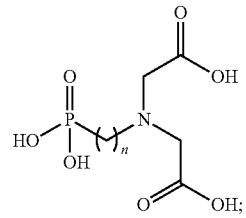

wherein n is an integer ranging between 1 and about 5.

Element 15: wherein the N-(phosphonoalkyl)iminodiacetic acid comprises N-(phosphonomethyl)iminodiacetic acid.

Element 16: wherein the corrosion inhibitor composition further comprises an organic corrosion inhibitor.

Element 17: wherein a hydrofluoric acid concentration or a generatable hydrofluoric acid concentration in the treatment fluid ranges between about 0.5 wt. % and about 5 wt. %.

Element 18: wherein a concentration of the N-(phosphonoalkyl)iminodiacetic acid or any salt thereof in the treatment fluid ranges between about 0.5 wt. % and about 10 wt. %, and a concentration of boric acid in the treatment fluid ranges between about 2 wt. % and about 14 wt. %.

Element 19: wherein a concentration of the N-(phosphonoalkyl)iminodiacetic acid or any salt thereof in the treatment fluid ranges between about 0.5 wt. % and about 10 wt. %.

Element 20: wherein a concentration of boric acid in the treatment fluid ranges between about 2 wt. % and about 14 wt. %.

Element 21: wherein the boric acid and the N-(phosphonoalkyl)iminodiacetic acid or any salt thereof are introduced to the treatment fluid from separate fluid streams.

Element 22: wherein a hydrofluoric acid concentration or a generatable hydrofluoric acid concentration in the combined treatment fluid ranges between about 0.5 wt. % and about 5 wt. %, a concentration of the N-(phosphonoalkyl)iminodiacetic acid or any salt thereof in the combined treatment fluid ranges between about 0.5 wt. % and about 10 wt. %, and a concentration of boric acid in the combined treatment fluid ranges between about 2 wt. % and about 14 wt. %.

By way of non-limiting example, exemplary combinations applicable to A-D include:

The method of A in combination with elements 1 and 2.
The method of A in combination with elements 1 and 3.
The method of A in combination with elements 1 and 4.
The method of A in combination with elements 2, 6 and 7.
The method of A in combination with elements 6, 7 and 8.
The method of A in combination with elements 9, 10 and 21.
The method of A in combination with elements 10 and 12.
The method of A in combination with elements 15 and 16.
The method of A in combination with elements 1, 2 and 13.
The method of B in combination with elements 17 and 18.
The method of B in combination with elements 17 and 19.
The method of B in combination with elements 17 and 20.
The method of B in combination with elements 17 and 21.

The method of B in combination with elements 15 and 16.
The method of B in combination with elements 12 and 13.
The method of B in combination with elements 13 and 17.
The method of C in combination with elements 11 and 12.
The method of C in combination with elements 11, 12 and 13.
The method of C in combination with elements 21 and 22.
The system of D in combination with elements 17 and 18.
The system of D in combination with elements 17 and 19.
The system of D in combination with elements 17 and 20.
The system of D in combination with elements 16, 17 and 18.

To facilitate a better understanding of the embodiments of the present disclosure, the following examples of preferred or representative embodiments are given. In no way should the following examples be read to limit, or to define, the scope of the disclosure.

EXAMPLES

Example 1

A Ti Grade 1 or Ti Grade 29 substrate was exposed for 6 hours at constant temperature to various treatment fluids comprising hydrofluoric acid (1 or 1.5 wt. %) generated from ammonium bifluoride in water. The pH was 2.8. 4 wt. % boric acid, 5 wt. % CLA-WEB stabilizing additive (Halliburton Energy Services), and 0.5 wt. % surfactant were present in all cases, and the PMIDA concentration was varied as further specified in Tables 2 and 3 below. The data in Table 2 is for a Ti Grade 1 alloy, and the data of Table 2 is for a Ti Grade 29 alloy.

TABLE 2

| Entry | Temperature (° F.) | [HF] (wt. %) | [PMIDA] (wt. %) | Additional Corrosion Inhibitor | Corrosion Loss (lb/ft²) |
|---|---|---|---|---|---|
| 1 | 200 | 1.5 | 2.5 | MSA-III (2 wt. %) | 0.00053 |
| 2 | 200 | 1.5 | 2.5 | none | 0.00046 |

TABLE 3

| Entry | Temperature (° F.) | [HF] (wt. %) | [PMIDA] (wt. %) | Additional Corrosion Inhibitor | Corrosion Loss (lb/ft²) |
|---|---|---|---|---|---|
| 3 | 140 | 1 | none | MSA-III (2.5 wt. %) | 0.013 |
| 4 | 140 | 1 | 2.5 | none | 0.000 |
| 5 | 140 | 1 | none | HAI-OS (2.5 wt. %) | 0.005 |

As shown in Table 2, the combination of PMIDA and boric acid was effective to suppress corrosion of even an uninhibited titanium alloy. Corrosion loss rates were comparable in the presence or absence of an additional corrosion inhibitor. As shown in Table 3, for an inhibited titanium alloy, the combination of PMIDA and boric acid alone (entry 4) produced better corrosion inhibition than did the combination of a conventional corrosion inhibitor and boric acid (entries 3 and 5). No pitting was observed for any of the samples that were exposed to PMIDA and boric acid.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:
1. A method comprising:
contacting a metal surface with a corrosive environment, the metal surface comprising titanium or a titanium alloy and the corrosive environment comprising hydrofluoric acid;
introducing a corrosion inhibitor composition to the corrosive environment, the corrosion inhibitor composition comprising boric acid and an N-(phosphonoalkyl) iminodiacetic acid or any salt thereof;
contacting the metal surface with the corrosion inhibitor composition; and
suppressing corrosion of the metal surface by the corrosive environment through contact with the corrosion inhibitor composition.
2. The method of claim 1, wherein a hydrofluoric acid concentration in the corrosive environment ranges between about 0.5 wt. % and about 5 wt. %.
3. The method of claim 2, wherein a concentration of the N-(phosphonoalkyl)iminodiacetic acid or any salt thereof in the corrosive environment ranges between about 0.5 wt. % and about 10 wt. %, and a concentration of boric acid in the corrosive environment ranges between about 2 wt. % and about 14 wt. %.

4. The method of claim 1, wherein a concentration of the N-(phosphonoalkyl)iminodiacetic acid or any salt thereof in the corrosive environment ranges between about 0.5 wt. % and about 10 wt. %.

5. The method of claim 1, wherein a concentration of boric acid in the corrosive environment ranges between about 2 wt. % and about 14 wt. %.

6. The method of claim 1, wherein the corrosion inhibitor composition is introduced to the corrosive environment before the corrosive environment contacts the metal surface.

7. The method of claim 6, wherein the corrosive environment comprises a treatment fluid and the corrosion inhibitor composition is present in the treatment fluid.

8. The method of claim 7, further comprising:
introducing the treatment fluid into a wellbore penetrating a subterranean formation, the metal surface being present in the wellbore or in fluid communication with the wellbore.

9. The method of claim 8, further comprising:
contacting a siliceous material with the treatment fluid; and
at least partially dissolving the siliceous material with the treatment fluid.

10. The method of claim 1, wherein the boric acid, or the N-(phosphonoalkyl)iminodiacetic acid or any salt thereof, or any combination thereof are contacted with the metal surface before being introduced to the corrosive environment.

11. The method of claim 10, wherein the corrosive environment comprises a treatment fluid.

12. The method of claim 11, further comprising:
introducing the treatment fluid into a wellbore penetrating a subterranean formation, the metal surface being present in the wellbore or in fluid communication with the wellbore.

13. The method of claim 12, further comprising:
contacting a siliceous material with the treatment fluid; and
at least partially dissolving the siliceous material with the treatment fluid.

14. The method of claim 1, wherein the metal surface comprises at least a portion of a subsea riser structure.

15. The method of claim 1, wherein the N-(phosphonoalkyl)iminodiacetic acid has a structure of

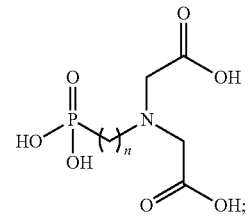

wherein n is an integer ranging between 1 and about 5.

16. The method of claim 15, wherein the N-(phosphonoalkyl)iminodiacetic acid comprises N-(phosphonomethyl)iminodiacetic acid.

17. The method of claim 1, wherein the corrosion inhibitor composition further comprises an organic corrosion inhibitor.

* * * * *